Figure 1:
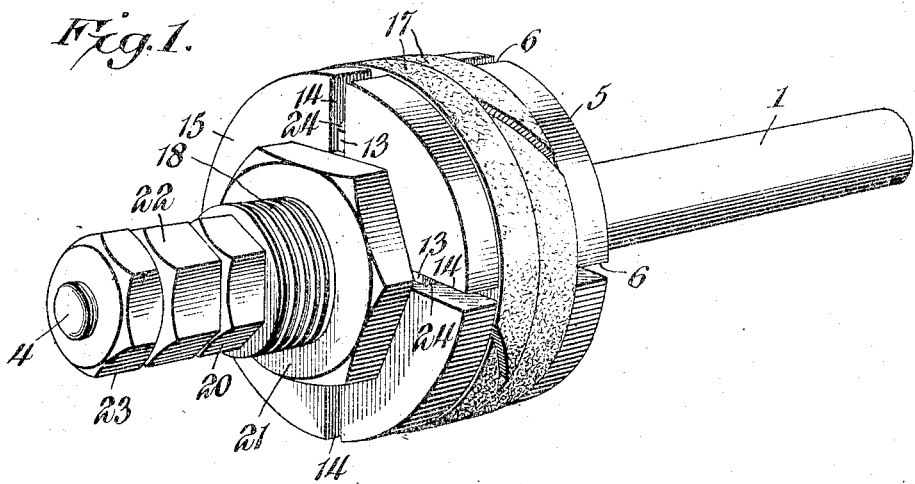

W. THOMPSON.
PISTON HEAD.
APPLICATION FILED MAR. 10, 1911.

1,003,304.

Patented Sept. 12, 1911.

2 SHEETS—SHEET 1.

WITNESSES
Howard D. Orr.
F. T. Chapman.

Walter Thompson,
INVENTOR,
BY
ATTORNEY

W. THOMPSON.
PISTON HEAD.
APPLICATION FILED MAR. 10, 1911.
1,003,304.
Patented Sept. 12, 1911.
2 SHEETS—SHEET 2.
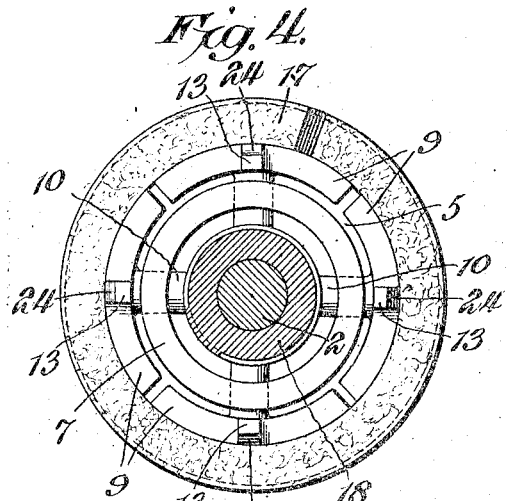
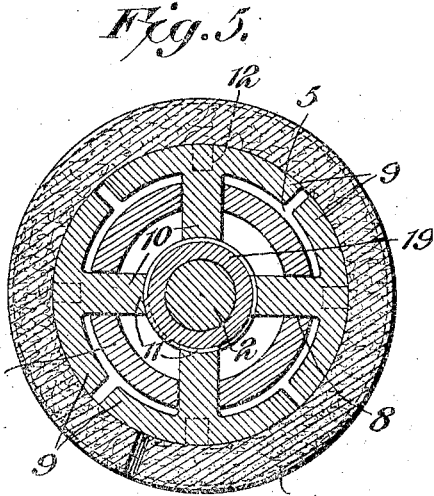
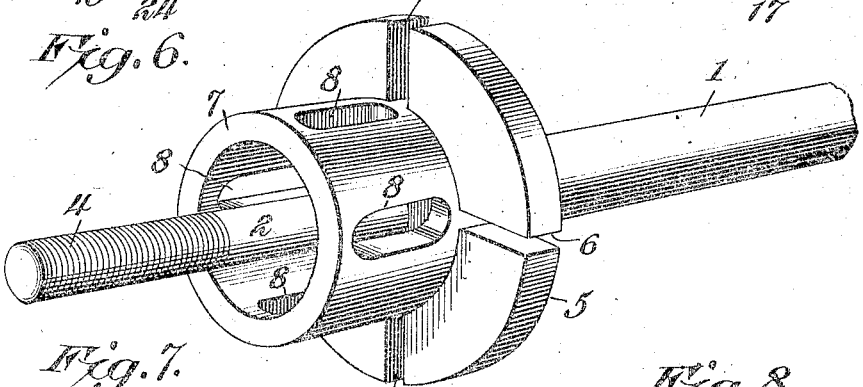
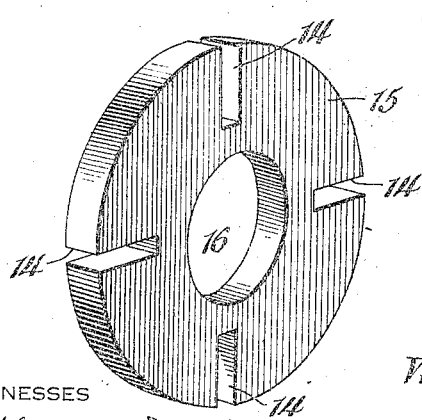
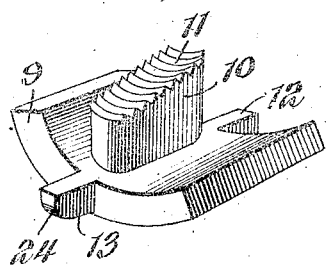
WITNESSES
Howard D. Orr.
F. T. Chapman.
Walter Thompson, INVENTOR,
BY
C. G. Siggers
ATTORNEY

UNITED STATES PATENT OFFICE.

WALTER THOMPSON, OF CHESTER, PENNSYLVANIA, ASSIGNOR OF ONE-HALF TO JAMES M. THOMPSON, OF CHESTER, PENNSYLVANIA.

PISTON-HEAD.

1,003,304.

Specification of Letters Patent. Patented Sept. 12, 1911.

Application filed March 10, 1911. Serial No. 613,595.

*To all whom it may concern:*

Be it known that I, WALTER THOMPSON, a citizen of the United States, residing at Chester in the county of Delaware and State of Pennsylvania, (whose post-office address is 637 Morton avenue, Chester, Pennsylvania,) have invented a new and useful Piston-Head, of which the following is a specification.

This invention has reference to improvements in piston heads and is designed more particularly to produce a piston head wherein the packing is readily expansible to produce the requisite fit against the inner wall of the cylinder to prevent leakage and to take up wear from time to time.

The piston head of the present invention is designed more particularly for use in connection with pumps for different kinds of liquid and is susceptible of use in connection with a great variety of pumps, and particularly for water and like pumps.

In accordance with the present invention there is provided a piston head carried by a suitable piston rod, said head having at an appropriate intermediate distance from the longitudinal axis an annular flange concentric with the piston rod and provided with radially disposed passages for the reception of stems formed on or carried by curved followers, which, together define substantially a cylinder to the exterior of which packing rings are applied, so that these followers may be forced radially to urge the packing rings into engagement with the inner wall of the cylinder containing the piston head. The ends of the stems of the followers presented toward the longitudinal axis of the piston head are tapered and threaded and receive a threaded tapered sleeve applied to an extension of the piston rod, so that when the sleeve is turned the followers may be forced radially outward to expand the packing rings. By the application of appropriate lock nuts the structure may be held in any position of adjustment against accidental displacement, but readjustment is readily made at any time desired.

The invention will be best understood from a consideration of the following detailed description taken in connection with the accompanying drawings forming a part of this specification, with the understanding, however, that while the drawings show a practical embodiment of the invention the latter is susceptible of various other embodiments without material change in structure or arrangement of parts, such as would entail a departure from the present invention.

Figure 2:
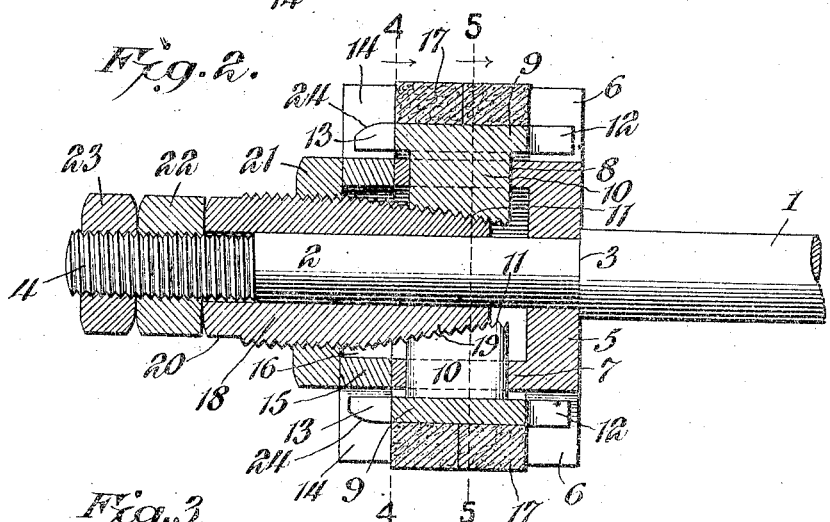
Figure 3:
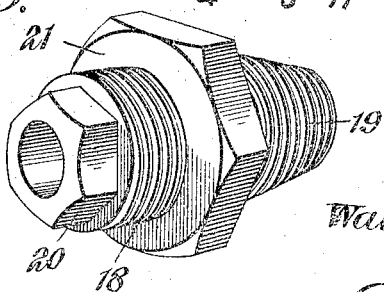

In the drawings:—Figure 1 is a perspective view of the improved piston head. Fig. 2 is an axial section with some parts in elevation. Fig. 3 is a perspective view of the taper screw adjusting sleeve. Fig. 4 is a section on the line 4—4 of Fig. 2. Fig. 5 is a section on the line 5—5 of Fig. 2. Fig. 6 is a perspective view of the piston rod and the piston body applied thereto, other parts being omitted. Fig. 7 is a perspective view of a cap plate employed to hold the packing rings in place. Fig. 8 is a perspective view of one of the expansion followers designed to act on the packing rings.

Referring to the drawings, there is shown a piston rod 1 which may, so far as the present invention is concerned, be of any suitable construction. This piston rod terminates at one end in a stem 2 of reduced diameter, there being an annular shoulder 3 at the junction of the stem and main body of the piston rod, while the outer or free end of the reduced portion 2 is screw threaded, as shown at 4.

Applied to the stem 2 is a piston body member 5 in the form of a disk provided with equi-distantly disposed radial recesses 6 leading from the periphery of the disk toward the center and terminating at an annular flange 7 extending from one face of the disk in concentric relation to the longitudinal axis of the stem 2, this flange being, in the particular showing of the drawings, of even diameter throughout and provided with radial slots 8 elongated in the direction of the length of the flange, this flange projecting from the face of the disk 5 remote from that engaging the shoulder 3, since the body of the piston is seated against the said shoulder 3. The inner wall of the flange 7 is spaced from the stem 2 for an appropriate distance.

Applied to the exterior of the flange portion 7 of the body member of the piston are followers 9 each in the form of a circular segment and when lying close to the outer wall of the flange 7 forming a nearly complete cylinder, this being the preferred, although not a mandatory form. The length of each follower 9 in the direction of its longitudinal axis of generation is substantially that of the flange 7, although it may be slightly less in length than the flange to prevent binding. Each follower 9 is formed with a central radial stem 10 on its concaved face, said stem being elongated in the direction of the longitudinal axis of generation of the segment, but the stem is of less length than the segment, and is of such size as to freely but quite closely fit a corresponding slot 8 in the cylindrical flange 7, the end of the stem remote from the follower being tapered lengthwise and formed with screw threads 11 for a purpose which will presently appear. The length of the stem in the direction away from the concaved face of the follower is such that the wider end of the stem will closely approach the stem 2 when the follower is in contact with the outer surface of the cylindrical flange 7, while the narrow end of the stem 10 is at a greater distance from the stem 2.

At the two ends of the follower in line with the stem 10 are lugs 12 and 13, respectively, the lug 12 being of a size to enter a respective recess 6 in the disk 5 and the lug 13 entering a like recess 14 in a disk 15 designed to be applied to the end of the cylindrical flange 7 remote from the disk 5, the said disk 15 having a central circular opening 16 of a diameter approximately that of the flange 7.

The two flanges 5 and 15 are designed to confine between them packing rings 17, of which but two are shown in the drawings, but it will be understood that any number of packing rings desirable may be employed.

Adapted to the stem 2 is a cylindrical sleeve 18 having one end 19 tapered and screw threaded both along the cylindrical portion and the tapered portion, the end 20 of the sleeve remote from the tapered portion being given the shape of a hexagon for the application of a wrench, although, of course, any other shape than that of a hexagon may be employed. The taper screw-threaded end 19 of the sleeve 18 is adapted to engage the screw threads 11 of the stems 10 of the followers 9, so that when the sleeve is turned in the proper direction, this being customarily in the right hand or clockwise direction, the taper end of the sleeve will be caused to travel along the threaded portions of the stems 10, and since under these conditions the taper end 19 engages the threaded portions of the stems 10 with constantly increasing diameter, these stems are forced radially outward from the longitudinal axis of the extension 2, and the followers 9 participate in such movement and the packing rings 17 are constrained to expand, thus presenting an increasing outer diameter, and if the outer surfaces of the packing rings are already in engagement with the inner wall of a cylinder in which the piston moves, the rings will be brought into engagement with the cylinder with increasing pressure, so that all wear or leak may be effectually taken up.

Applied to the cylindrical threaded portion of the sleeve 18 is a nut 21, which may be brought into engagement with the disk 15 on the face remote from the cylindrical flange 7, thus forcing the disk 15 into engagement with the flange 7 and at the same time locking the sleeve 18 against rotative movement.

To lock the piston head firmly against the shoulder 3 there is applied to the threaded end 4 of the extension 2 a nut 22 and beyond this a jam nut 23, the nut 22 bearing against the corresponding end 20 of the sleeve 18, which latter through the jam nut 21 and disk 15 locks the piston head body against the shoulder 3.

Of course, the piston rod 1 may be otherwise united to the body of the piston head, but the nuts 22 and 23 are efficient for the purpose.

In order that excessive friction may be prevented to the movement of the sleeve 18 to force the followers 9 outwardly, the stems 10 may fit comparatively loosely in the slots 8, and these followers are guided by the lugs 12 within the recesses 6. Furthermore, the lugs 13 hold the disk 15 against turning when the nut 21 is forced against the disk and the outer corners of the lugs 13 may be rounded, as indicated at 24, to facilitate the placing of the packing rings 17 upon the exterior of the followers 9 after the latter have been placed upon the piston body.

Whenever it is desired to tighten the packing it is only necessary to loosen the nuts 23 and 22 and the nut 21, when the sleeve 18 may be rotated by a wrench applied to the hexagonal end 20, thus causing a radial outward movement of the several followers simultaneously and a corresponding expansion of the packing rings, after which the nut 21 may be tightened into jamming position and the nuts 22 and 23 screwed tight in order, thus again locking the several parts of the piston head in position.

When it is desirable to renew the packing rings, the nuts 23 and 22 are removed in order, then the sleeve 18 is unscrewed after loosening the nut 21 and the pressure on the packing rings due to the engagement therewith of the followers 9 is relieved, since these followers may now move freely toward the central longitudinal axis of the piston rod extension 2, and on the removal of the disk 15 the packing rings may be withdrawn from the followers and new packing rings introduced, after which the parts may be applied in the reverse order of their removal, and suitable adjustments made and the nuts screwed again into locking position, when the piston is ready for further service, the packing rings being readily tightened from time to time as necessary in the manner already described.

The followers have each a radial movement throughout its range of travel in the piston body member, being guided by the engagement of the walls of the respective slot 8 with the stem 10. Because of this construction the packing may be substantially all used up before renewal is necessary. For instance, if the expansion of the followers is three-eighths of an inch then three-eighths inch square packing may be used. For one-inch expansion of the followers one-inch square packing may be used, and so on.

What is claimed is:—

1. In a piston head, radially movable expansion members for engaging packing, and an axially movable screw, the radially movable members having screw threads in coöperative relation to the axially movable screw for the actuation of the expansion members by said screw.

2. A piston provided with radially movable members for expanding the packing of the piston, said members being provided with screw threaded portions in taper relation to the longitudinal axis of the piston head, and a taper screw member movable in the direction of the longitudinal axis of the piston in engaging relation to the screw threads of the radially movable members for actuating the latter.

3. A piston provided with radially movable members each having a stem terminating in a threaded portion in taper relation to the longitudinal axis of the piston, and a taper screw adapted to engage the taper portions of the stems of the radially movable members for the actuation of the latter.

4. A piston having a body member with an intermediate axially disposed annular flange having radial slots therethrough, expansion members in the form of circular segments and each having a stem adapted to a corresponding slot in the piston head flange, each expansion member stem having its end toward the central longitudinal axis of the piston head tapered with relation to said axis and screw threaded, and a tapered screw adapted to engage the screw threaded ends of the stems to actuate the expansion members.

5. A piston provided with expansion members for packing, each of said members being provided with a guiding stem directed toward the central longitudinal axis of the piston, and means interlocking with and acting on the ends of the guide members presented toward the axis of the piston for forcing the expansion member radially away from the longitudinal axis of the piston.

6. A piston comprising a disk like body member with radial passages therein and an annular flange in concentric relation to the longitudinal axis of the piston, a retaining disk having radial passages therein matching the radial passages in the disk like portion of the piston head body and adapted to engage the end of the annular flange remote from the first named disk like portion, said flange having radial guide passages therethrough, expansion members adapted to be lodged between the disk like members exterior to the flange and each provided with a stem adapted to traverse a corresponding passage through the annular flange and with terminal lugs adapted to respective passages in the disk like portion of the piston head body and the mating disk, a piston rod having a terminal portion adapted to axially traverse the piston head and threaded at its free end, a threaded sleeve adapted to the extension of the piston rod, and provided with a lock nut adapted to engage the disk applied to the free end of the annular flange, said sleeve having a portion adapted to act on the stems of the expansion members to force them radially outward, and nuts adapted to the threaded portion of the extension of the piston rod.

7. A piston comprising a disk like body member with radial passages therein and an annular flange in concentric relation to the longitudinal axis of the piston, a retaining disk having radial passages therein matching the radial passages in the disk like portion of the piston head body and adapted to engage the end of the annular flange remote from the first named disk like portion, said flange having radial guide passages therethrough, expansion members adapted to be lodged between the disk like members exterior to the flange and each provided with a stem adapted to traverse a corresponding passage through the annular flange and with terminal lugs adapted to respective passages in the disk like portion of the piston head body and the mating disk, a piston rod having a terminal portion adapted to axially traverse the piston head and threaded at its free end, a threaded sleeve adapted to the extension of the piston rod and provided with a lock nut adapted to engage the disk applied to the free end of the annular flange, said sleeve having a portion adapted to act on the stems of the expansion members to force them radially outward, and nuts adapted to the threaded portion of the extension of the piston rod, the free ends of the stems of the expansion members being tapered and screw threaded and the corresponding end of the sleeve being tapered and screw threaded and adapted to engage the screw threads of the stems of the expansion members.

8. A piston having a disk like portion provided with radial slots opening at the periphery and with an annular flange extending from one face of the disk like portion in concentric relation to the longitudinal axis of the piston hub, said flange having longitudinally extended radial slots therethrough, expansion members of circular segmental form each provided on the concaved face with a stem adapted to traverse a corresponding slot through the flange and terminating in a taper edge having screw threads formed therein, each of said expansion members having projecting lugs in line with the stem, a retaining disk adapted to the end of the flange remote from the disk portion of the piston body and provided with radially entering recesses matching the radial recesses of the disk like portion of the piston head body, a piston rod having an extension passing axially through the piston head, said piston rod also being provided with an abutment for the piston head, a threaded sleeve having a cylindrical portion and one end tapered to engage the threaded portions of the taper stems of the expansion members, a lock nut on the cylindrical portion of the threaded sleeve, and means for locking the piston head on the piston rod.

9. A piston having a body member of disk like form with an axially extended annular flange provided with axially extended radial passages therethrough and the disk like portion of the body of the piston having peripherally entering recesses matching the slots through the flange, a disk adapted to the end of the flange remote from the disk like portion of the piston body and also provided with a central opening and with peripherally entering radial recesses corresponding to the recesses in the disk like portion of the piston body, expansion members of circular segmental form, each provided with an axially extended stem adapted to traverse the slots in the annular flange and having their ends directed toward the axis of generation of the members tapered and screw threaded, each of said members also being provided at each end with a lug adapted to a respective recess in the disk like portion of the piston head body and of the disk applied thereto, the lugs at the ends of the expansion members away from the disk like portion of the piston head body having rounded outer edges, a piston rod having an extended portion adapted to traverse the piston head axially and terminating in a screw threaded end, a threaded sleeve adapted to the extended portion of the piston rod and having a cylindrical portion provided with screw threads, and a taper portion provided with screw threads, the taper portion being adapted to enter the annular flange through the opening in the disk applied thereto and engage the threaded taper ends of the stems of the expansion members, a lock nut for the cylindrical portion of the screw threaded sleeve, and holding nuts applicable to the threaded end of the piston rod extension.

In testimony, that I claim the foregoing as my own, I have hereto affixed my signature in the presence of two witnesses.

WALTER THOMPSON.

Witnesses:
 M. F. HUMBERT,
 BENJ. C. FOX.